Aug. 4, 1925.

W. L. CASPER ET AL 1,548,022

INDUCTANCE DEVICE

Filed April 23, 1923

Inventors:
William L. Casper,
Ernest L. Schwartz,
by Joel C. R. Roemer  Atty.

Patented Aug. 4, 1925.

1,548,022

UNITED STATES PATENT OFFICE.

WILLIAM L. CASPER, OF BROOKLYN, NEW YORK, AND ERNEST L. SCHWARTZ, OF EAST ORANGE, NEW JERSEY, ASSIGNORS TO WESTERN ELECTRIC COMPANY, INCORPORATED, OF NEW YORK, N. Y., A CORPORATION OF NEW YORK.

INDUCTANCE DEVICE.

Application filed April 23, 1923. Serial No. 634,044.

*To all whom it may concern:*

Be it known that we, WILLIAM L. CASPER and ERNEST L. SCHWARTZ, citizens of the United States, residing at Brooklyn, in the county of Kings, State of New York, and East Orange, in the county of Essex, State of New Jersey, respectively, have invented certain new and useful Improvements in Inductance Devices, of which the following is a full, clear, concise, and exact description.

This invention relates to inductance devices and more particularly relates to transformers.

An object of this invention is to provide a shielding arrangement between two windings of an inductance device such as a transformer.

A second object of the invention is to provide an arrangement whereby the various windings of an inductance device may be independently wound and assembled in an economical manner.

Shielding means between the primary and secondary windings of a transformer in a signaling circuit are frequently of importance in reducing electrostatic effects between the windings. For example, shielding means between transformer windings are particularly desirable when the transformer is used in a physical circuit which is also phantomed whereby the phantom currents in the primary winding may be prevented from passing over to the secondary winding due to capacity between the windings which tends to give rise to cross-talk between the physical circuit and the phantom circuit.

In order to reduce the capacity effects between the windings of an inductance device, the shielding arrangement hereinafter described in detail employs a metallic spool on which the inner winding is wound. A metal sheet is slipped over this spool and arranged to form with the spool and its projecting ends a substantially complete metallic enclosure for the inner winding except for the necessary small aperture or apertures through which the leads for the winding pass. The other winding is then wound on a spool which may be of insulating material having such dimensions as to fit snugly over the metallic sheet. With the spool and sheet grounded, the arrangement substantially eliminates not only direct capacity effects between the two windings, but also eliminates the indirect capacity effects due to each winding having a capacity to the core or case employed.

Figure 1:
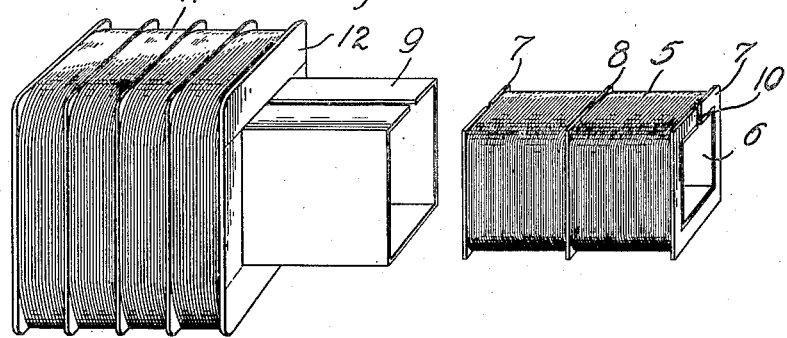
Figure 2:
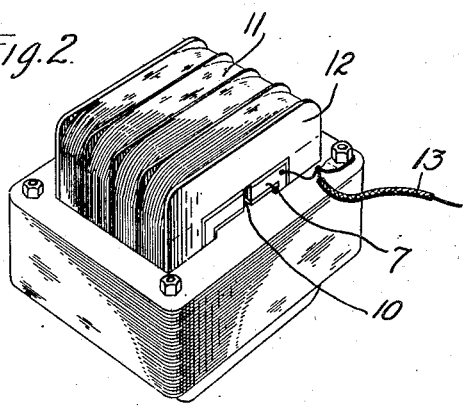
Figure 3:
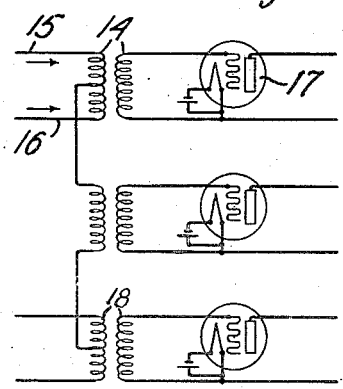

Referring to the drawings, Fig. 1 represents the manner of assembly of the various parts of the transformer embodying this invention. Fig. 2 shows the assembly after the core material has been inserted within the windings, and Fig. 3 illustrates an electric circuit in which the transformer of this invention is of particular application in reducing cross-talk difficulties.

Referring to Fig. 1, the primary winding 5 is shown wound on a metallic spool 6 having squared ends 7. If desired, the winding 5 may be wound in a plurality of sections, two, for example, a metallic separator 8 of similar size to the end pieces 7 of the spool being provided at the center to separate the two halves of the winding. A sheet of metal is then bent to form a cover 9 of such a size as to fit snugly over the spool 6, the cover resting on the end pieces 7 and the separator 8 and forming with the spool a substantially complete metallic enclosure for the winding 5.

In general, it would be undesirable for either the spool 6, the end pieces 7, separator 8, or the cover 9 to be circumferentially complete and an air gap is arranged at the point 10 along the spool. The end pieces 7 are similarly broken and disconnected at the same point and the two ends of the cover 9 are spaced apart a distance equal to the air gap in the spool. Care should be taken of course to place the cover 9 on the spool such that the air gap in the cover 9 occurs at the same point as the air gap in spool 6 and end pieces 7. It is, of course, obvious that the air gaps in members 6, 7, 8 and 9 may be filled with insulating material or other material of high resistance since the precaution to be taken is merely to prevent the transformer from having a short circuited turn of low resistance.

The secondary winding 11 is preferably wound on a second spool 12 which may be of insulating material and having such internal dimensions that it may be readily slipped over the cover 9 in order that the secondary winding may be superposed on the primary winding in an efficient manner.

After the secondary winding has been placed over the cover 9, the core material for the transformer may be put in place as shown in Fig. 2. The core, for example, may comprise a plurality of L shaped and F shaped laminations which are fitted into the spool 6 in the usual manner to form a magnetic circuit.

In many cases, it will be found desirable to insure good contact between the cover 9 and the end pieces 7 by soldering them together or connecting them in any other suitable manner. The metallic box comprising the spool 6, end pieces 7 and the cover 9 may then be grounded by suitable ground wire 13.

Such a metallic enclosure for the winding 5 has been found to substantially eliminate capacity effects between the primary and secondary windings of a transformer to a high degree. The metallic enclosure not only eliminates the direct capacity between the two windings but also eliminates the indirect capacity effects due to the capacity each winding may have to the core or the housing containing the windings. In one case a transformer made in this manner had a capacity between windings of less than one micro-micro-farad.

It is to be understood, of course, that the windings and the core structure shown in Fig. 2 may be treated and potted in any desirable manner in order to provide a satisfactory housing for the same.

The transformer described above has been found particularly useful to employ as the input transformers 14 and 15 of a phantom group repeater of the type shown, for example, in Fig. 3. The phantom currents flowing, for example, in parallel over line conductors 15 and 16 due to capacity effects between the primary and the secondary windings of transformer 14 will tend to be impressed upon the side circuit vacuum tube repeater 17 thereby giving rise to cross-talk between the side circuit and the phantom circuit; the effect of this capacity is especially accentuated because the transformer usually is a high step-up transformer which causes a high voltage to be developed across the secondary winding. When, however, the primary winding of the input transformer 14 or similar input transformer 18 is enclosed in a metallic box of the type described above, it has been found that this cross-talk difficulty is substantially eliminated.

It is to be understood that the feature of winding the primary and secondary windings on separate spools which are later superposed may be employed in other cases than the one described above in which its particular use is to aid in the reduction of cross-talk. Other modifications of this invention will occur to those skilled in the art and it is to be understood that this invention may possess widely different embodiments without departing in anywise from the spirit of this invention as defined in the appended claims.

The invention claimed is:

1. An inductance device comprising a core, a metallic spool having projecting end pieces around said core, an inductive winding wound on said spool, a stiff metallic sheet surrounding said spool and supported by the projecting end pieces of said spool, and a second winding around said sheet.

2. An inductance device comprising a core, a metallic spool having projecting end pieces around said core, an inductive winding wound on and supported by said spool, a metallic cover for said spool, said cover and said spool forming a substantially complete metallic closure for said winding, a second spool fitting over said cover, and a second winding wound on said second spool.

3. An inductance device comprising a core, a metallic spool having projecting end pieces surrounding said core, said spool forming an incomplete turn around said core, a winding wound on said spool, a cover for said spool supported by the projecting ends of said spool, said cover forming an incomplete turn around said winding, and a second winding surrounding said cover.

4. A transformer comprising a core, a spool having projecting end pieces surrounding said core having a rectangular opening, said spool being slotted to make said spool circumferentially incomplete, a winding wound on said spool, a stiff metallic cover surrounding said winding and supported by the projecting end pieces of said spool, a second spool fitting over said cover, and a second winding wound on said second spool.

5. An inductance device comprising a core, a circumferentially incomplete metallic spool having projecting end pieces around said core, a winding wound on said spool, and a circumferentially incomplete cover for said spool.

6. An inductance device comprising a core, a metallic spool having projecting end pieces around said core, the ends and the body of said spool being slotted to make said spool circumferentially incomplete, a winding on said spool and a slotted cover for said spool supported by the ends of said spool and having the slot in the cover coinciding with the slot in the spool.

7. A transformer comprising a hollow metallic support member serving as a spool, windings wound thereon, a core of metallic material within the support member, a second support member of magnetic material surrounding said hollow support member, and windings on said second support member, said two support members serving to substantially completely enclose one of said windings to electrostatically shield said two windings from each other.

8. A transformer comprising superimposed coils, one of said coils being wound on a metallic supporting spool, another of said coils being wound on another metallic supporting spool, the second spool surrounding the first and cooperating therewith to substantially completely electrically shield said two windings from each other.

In witness whereof we hereunto subscribe our names this 12th and 17th day of April, A. D., 1923.

WILLIAM L. CASPER.
ERNEST L. SCHWARTZ.